No. 685,455. Patented Oct. 29, 1901.
R. KINKEAD.
INSTRUMENT FOR HANGING AND LINING UP SHAFTING.
(Application filed May 29, 1901.)
(No Model.) 2 Sheets—Sheet 1.
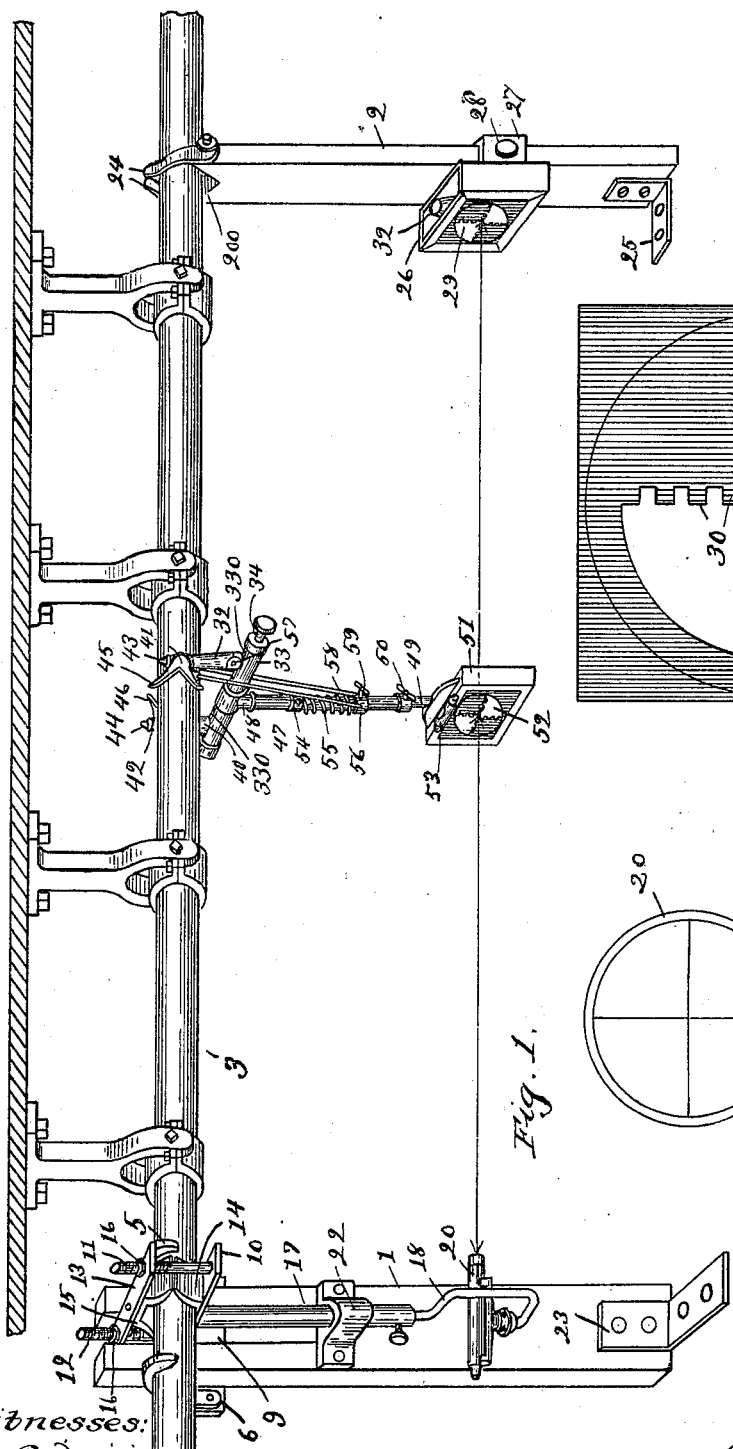

No. 685,455. Patented Oct. 29, 1901.
R. KINKEAD.
INSTRUMENT FOR HANGING AND LINING UP SHAFTING.
(Application filed May 29, 1901.)
(No Model.) 2 Sheets—Sheet 2.
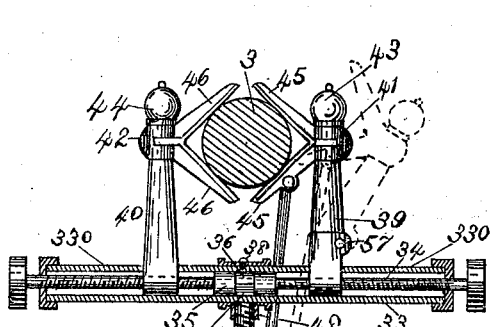
Fig. 4.
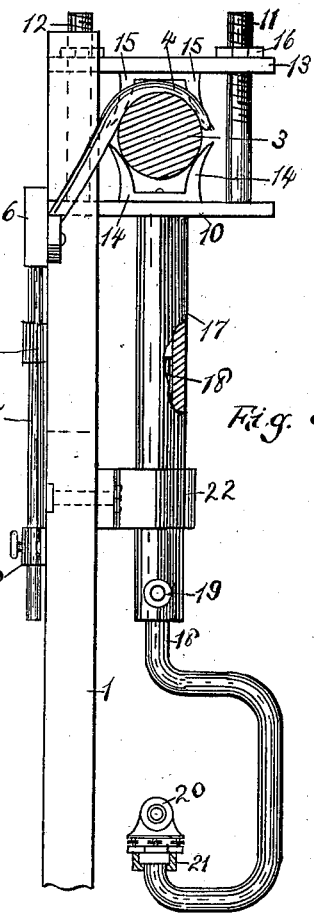
Fig. 5.
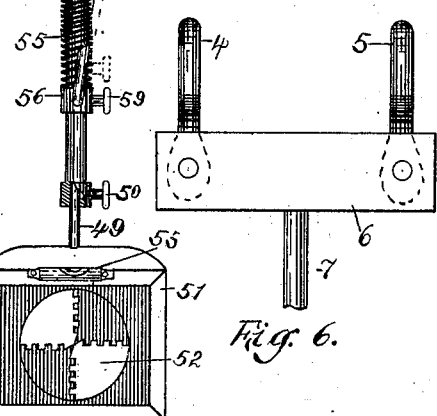
Fig. 6.
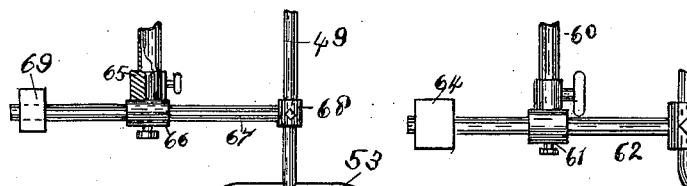
Fig. 7. Fig. 8.
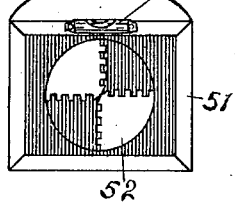
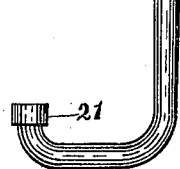
Fig. 9.
Witnesses:
G. E. Ucker.
John F. Neal
Inventor:
Richard Kinkead,
by Louis H. Harriman
Atty.

UNITED STATES PATENT OFFICE.

RICHARD KINKEAD, OF LAWRENCE, MASSACHUSETTS.

INSTRUMENT FOR HANGING AND LINING UP SHAFTING.

SPECIFICATION forming part of Letters Patent No. 685,455, dated October 29, 1901.

Application filed May 29, 1901. Serial No. 62,445. (No model.)

*To all whom it may concern:*

Be it known that I, RICHARD KINKEAD, a citizen of the United States, and a resident of Lawrence, in the county of Essex and State of Massachusetts, have invented certain new and useful Improvements in Apparatus for Alining Shafting, of which the following is a specification.

It is a well-known fact that one of the principal causes of loss of power by friction in mills, factories, &c., is that caused by the shafting being out of alinement and that to have a line of shafting run smoothly and with the least friction and heating possible it is necessary that the center line of the shaft-hangers shall be in one straight line.

Prior to my invention various methods of lining up shafting have been devised; but so far as I am aware no system or means has yet been devised by which shafting may be conveniently alined with even approximate accuracy. It has always been necessary to employ skilled mechanics to do this work, and with present methods much time is always consumed in alining a comparatively short length of shafting, in addition to the fact that indifferent results only are secured. The method of alining shafting generally employed, and which, so far as I am aware, is the only method giving even approximate accurate results, is that of measuring from a taut line drawn from one end of the line of shafting to the other. This method is far from accurate, as it is impossible to prevent the line from sagging, and a slight jar or breeze will cause it to swing.

The object of my invention is to provide a means for alining shafting which enables a line of shafting of any length to be perfectly alined in a comparatively short time, which enables the mechanic to first readily ascertain how much each hanger is out of line with respect to the others and then bring the hangers into line by moving them as little as possible, which enables the shafting to be set on a line which is inclined to the horizontal, which enables the shafting to be alined without disturbing the pulleys and belts thereon or various objects which may intervene between the ends of the line of shafting, and which is so simple that a comparatively unskilled mechanic may employ it. I accomplish this object by employing an ordinary leveling-telescope, which is fixed in a certain position with respect to and at one end of the line of shafting, in connection with a fixed target, which is correspondingly located at the other end of the shafting, and a movable target, which is adapted to be moved to various positions between the ends of the shafting without altering its distance from the center of the section of shafting to which it is connected, so that by looking through the telescope a person may instantly ascertain the exact distance which a particular hanger must be moved to bring it into proper alinement. After the distance which each hanger is out of alinement is ascertained an average may be struck and the line determined with which the center lines of each hanger may be made to coincide by moving all of them the least possible distance. The telescope and target are then readjusted and the hangers are then moved to correspond with this line.

For a complete understanding of my invention reference is made to the accompanying drawings, in which—

Figure 1 is a perspective view showing the general application of my invention. Figs. 2 and 3 are detail views of the end of the leveling instrument and of a target which is specially adapted for my purpose, respectively. Fig. 4 is a front elevation, partly in cross-section, of the movable target. Fig. 5 is an end view of the support for the telescope. Fig. 6 is a partial view of the rear side thereof. Figs. 7 and 8 are views of certain devices which I employ when there are intervening objects between the ends of the shafting and directly beneath the same. Fig. 9 is a view of the rear side of the fixed target.

In setting up the apparatus herein described two wooden standards or supports 1 and 2 are employed at each end of the line of shafting. The standard 1 is connected at its upper end to the shafting 3, which it is desired to aline, by means of two hooks 4 and 5, which may be bolted directly to the standards or may be secured to a cross-bar 6, which is in turn secured to a rod 7, which passes through and is adjustably secured in one or more brackets 8 on the rear side of the standard. The upper end of the standard 1 is provided with a slot 9 in the middle thereof, as shown in Fig. 1.

A bar 10 is provided with two upright screw-threaded rods 11 and 12, which pass through apertures in a cross-bar 13. The upper side of bar 10 and under side of bar 13 are each provided with diverging fingers or arms 14 and 15, respectively, which are adapted to engage shafts of various sizes, preferably on the inner side thereof, as shown in Figs. 1 and 5. Nuts 16 on said rods 11 and 12 are adapted to support bar 10, so that fingers 14 will be held against the shaft 3. The fingers 14 and 15 are simply brought against the shaft; but the nuts are not tightened with sufficient force to prevent the shaft from turning between the fingers. The hooks 4 and 5, though they rest on the shaft, do not prevent the rotation thereof. A tube 17 is secured at its upper end to the under side of bar 10, and a rod 18 is adapted to telescope therein and be secured thereto in various positions by a set-screw 19. Rod 18 is bent laterally in the form of a D and then is upturned at its end to provide a support for an ordinary surveyor's leveling telescope 20, which is secured thereto by the swivel-ring 21, usually employed to secure it to a tripod. The tube 17 passes through a bracket 22, which is secured to the side of support 1 and holds said tube parallel to said support. The telescope is provided with the usual horizontal and vertical cross-lines (shown in Fig. 2) and with spirit-levels and adjusting-screws for adjusting the telescope to a horizontal position.

When the parts just described are connected, the standard 1 is moved until the vertical cross-line of the telescope coincides with a plumb-line which is hung by a loose loop from the shaft, thus indicating the perpendicular line from the center thereof. The bottom of the standard 1 is adjusted to bring the telescope approximately near to its proper position, and then its lower end is secured to the floor by an angle-bracket 23. I secure the final lateral adjustment by means of bracket 22, which is not at first bolted firmly against the standard 1, the bolts or nuts being left partially unscrewed, so that the bracket may be adjusted by tightening them, a backing being inserted between the base of the bracket and standard, if necessary. Any other convenient means for adjusting this bracket may be provided. The center of the upturned end of rod 18, on which the telescope is supported, is preferably slightly to one side of the center line of the straight upper portion thereof which is in the tube 17, as shown in Fig. 8, so that after the standard 1 and bracket 22 have been secured if it should be found that the center of the telescope is slightly to one side of the plumb-line the rod may be turned in the tube so as to bring it to the proper position.

The standard 2 at the opposite end of the shafting has a V-shaped notch 200 in its upper end and is made of such a length that when its lower end is resting on the floor the shafting may pass between the forks formed by said notch. Two fingers 24 are bolted to said forks and press on the upper side of the shaft, so as to hold the standard firmly against lateral movement without preventing the rotation of the shaft. An angle-bracket 25 secures the lower end of the standard firmly to the floor. A rectangular box 26 is adjustably secured to standard 2 by oppositely-arranged flanges 27 and set-screws 28, as shown in Figs. 1 and 9. The front face of this box is provided with a target 29. This target is specially designed for my purpose and is shown in a full-sized diagram in Fig. 3. The circular face which includes the target is divided into four equal sectors by the vertical and horizontal diameters thereof. One pair of the vertically or oppositely arranged sectors is opaque, and the other pair is translucent or transparent. The edges of the opaque sectors are provided with a regular series of square notches 30, which transmit light with the same freedom as the adjacent sectors. A regular series of opaque projections are thus made along each edge of each opaque sector, the ends of which exactly coincide with the vertical and horizontal diameters of the circle. Each projection is preferably one-eighth of an inch apart. As shown in the diagram, the square projections next to the center are one-fourth of an inch from the center, and tapered projections 31 from the vertex of each opaque sector meet at the center. The particular form of these projections is not essential; but it is essential that a readily-readable scale be formed on the edge of each sector which reads regularly from the center.

A lamp 32 is usually placed inside the box, so that the lines and scales may be readily seen through the telescope. The box is then adjusted so that the vertical and horizontal diameters of the target coincide exactly with the cross-lines of the telescope. This may be readily accomplished by means of the set-screws 28 or any other convenient means.

The movable target which I employ between the telescope and fixed target is best shown in Fig. 4, and comprises a tube 33, which has a rod 34 extending therethrough. Said rod is provided with an intermediate enlarged portion 35, which is accurately fitted in said tube and is provided with an annular groove 37 at its middle, in which an arc-shaped clip 36 is held by a screw 38. The rod 34 is thus free to rotate, but is firmly held against longitudinal movement. Any other convenient form of swivel connection between said rod 34 and tube 33 may be provided. The rod 34 is provided with a right-hand screw-thread on one side of the enlargement 35 and a left thread on the other side thereof, and said rod is screwed through the base of two standards 39 and 40, which extend perpendicularly from said rod on opposite sides of said enlargement, said standards passing through slots 330 in said tube, which act to hold them in exactly the same vertical plane. Two jaws 41 and 42 are secured to the upper ends of said standards 39 and 40, respectively, by bolts 43 and 44, which pass through the base thereof into said standards. Said jaws 41 and 42 are provided with a pair of diverging fingers 45 and 46, respectively, which are arranged at right angles to each other and have their inner or adjacent faces flat and smooth. Said jaws 41 and 42 are so supported with respect to each other on the ends of said standards that a line drawn from the vertex of the angle included by fingers 46 will exactly bisect both angles and will be exactly parallel to rod 34. Moreover, said standards are so arranged on said rod 34 that they are equidistant from its center, and a perpendicular line from the center of said rod will intersect the exact center of said bisecting line between the vertices of said angles. As the right and left screw-threads are of the same pitch, this relation will be exactly maintained whether the rod 34 is rotated to the right to draw said jaws together or to the left to separate them.

A tube 47 is threaded into a T-coupling 48, which is secured to the middle of tube 33, so that the center line of tube 47 exactly coincides with the perpendicular line at the center of rod 34. A rod 49 telescopes with tube 47 and is adjustably connected thereto by screw 50. A frame 51 is secured at its middle upper edge to the lower end of rod 49, and said frame carries a circular target 52, which is identical in every particular to the target 29 of the box 26, which is illustrated in the diagram of Fig. 3. The upper side of frame 51 carries a spirit-level 53, the bubble in which will be in the center of the glass when the perpendicular diameter of the target 52 intersects the center of any circle which may be inscribed between the fingers 45 and 46, so that the circle is tangent to all four faces of said fingers. A collar 54 is secured by a set-screw to tube 47, and a spring 55 is interposed between said collar and a collar 56. The standard 39 is hinged at 57 near its lower end, and a stiff link 58 connects said collar 56 with the lower arm 45 of said standard 39. The pivot of hinge 57 is so located that the radius of the inscribed circle between jaws 45 and 46, which is perpendicular to the lower jaw 45, will pass above said pivot, so that when the shaft 3 is clamped between said jaws, as shown in Fig. 4, and said standard 39 is swung on its hinge the jaws 45 will move away from the shaft and the end of the lower jaw will not strike the same and prevent the standard from being swung to the dotted position shown in Fig. 4 without first separating the jaws by turning rod 34. The spring 55 acts constantly to draw said standard 39 to the full-line position shown in Fig. 4, and said standard may be held in that position by set-screws 59 in collar 56 and may be thrown back to the dotted-line position by pushing collar 56 upwardly.

The manner of using my apparatus to aline a line of shafting is as follows: The telescope having been set up so that its center is directly beneath the center of the shafting and the fixed target 29 having been likewise arranged, as before described, the standard 39 of the movable target is thrown back to the position shown in dotted lines in Fig. 4, the fingers 46 are placed against the shaft 3, and the standard 39 is swung back to its vertical position, so that if the standards are the proper distance apart the fingers 45 will also engage the shaft, as shown in Fig. 4. If the fingers do not all come fairly against the shaft, the right and left threaded rod 34 will be rotated until they are properly adjusted. The target 52 will then swing by the weight of its frame and rods, so that its vertical diameter will coincide with a plumb-line from the center of the shaft. If the target is in this position, the bubble of the spirit-level will be in the middle of the glass; otherwise the target may be swung slightly to bring it to the proper position. This movable target is first hung on the shaft closely adjacent the fixed standard 2 and its vertical position is adjusted so that the horizontal and vertical diameters of the target will appear to coincide with the cross-lines of the telescope and with the diameters of the fixed target when one looks through the telescope. When this is accomplished, the mechanic will know that both targets are in line with the telescope. The movable target is then readily removed from the shaft without disturbing screw-rod 34 by sliding up the collar 56 and throwing back the standard 39, as previously described, and its jaws are then brought into engagement with the shaft beyond the next hanger, and if the shaft is the same size as before the rod 34 will not need readjustment. After the target is found to be level the mechanic looks through the telescope and notes exactly how much, if any, the vertical and horizontal diameters of the target are out of coincidence with the cross-lines of the telescope. For example, if the vertical cross-line of the telescope intersects the edge of the third projection to the left of the center of the target it will be instantly seen that the shaft is one-half an inch to the left of the center of the shaft where the telescope is located. This distance, together with the position of the target, is then carefully noted and the target is moved to a new position on the shaft close to the next hanger. The next observation may show the horizontal diameter of the target below the horizontal cross-line of the telescope a certain distance. This fact will be noted in like manner. The exact condition of each hanger in the line is thus determined and a curve is plotted and a general average straight line ascertained with which the center of the whole shafting may be made to coincide by moving the boxes of the hangers the least possible average distance. If it is then found desirable to adjust either or both ends of the shafting, this is first done, and the telescope and targets are again brought into line, as before described. The movable target is then again applied to the shafting at each hanger, as before, and while so attached each particular hanger is brought into line in turn, so that the center of the target is in the center line of the telescope.

In some instances where the shaft-hangers are attached to the ceiling of a room and the main pillow-blocks at the end of the shafting are supported on a firm foundation the shafting in the hangers will be found lower than that in the pillow-blocks, owing to the sinking of the ceiling. As it would be extremely expensive to lower the pillow-block bearing, and as it is usually not permissible to cut into the beams to raise the hangers so that the shafting may be made horizontal, I am enabled by using my previously-described appliances to set the shafting on an incline from the pillow-block without disturbing the latter and also without cutting into the beams. This may be easily accomplished by first ascertaining the relative heights of the various hangers with respect to the pillow-block and then lowering the end hanger to such an extent that a straight line from the center of the hanger to the center of the pillow-block will not pass above the middle of any hanger which is then raised to its fullest extent. The telescope is then readjusted to an inclination which exactly corresponds to the inclination of this line, and the hangers are adjusted, as before described, so that their center line is parallel to the inclined line. It will be obvious that the shafting will run practically as free from friction as when set in a horizontal position. If the shafting is supported on the floor, the whole apparatus may be used in an inverted position, only it will be necessary to provide slightly-different forms of supports for the telescope and fixed target, the provision of which will be within the skill of an ordinary mechanic. It is only essential, or at least extremely desirable, that the telescope and target be actually supported by the shaft. The movable target will be held in the vertical position by a workman while the person in charge of the telescope sights through it.

If there should be intervening objects, such as a pillar or machinery, between the ends of the shafting and beneath its center I employ the appliances shown in Figs. 7 and 8. In the case of the support for the telescope I substitute a rod 60 for the rod 18, said rod 60 being provided with a T-coupling 61 at its end, in which a horizontal bar 62 is adjustably secured. One end of said bar is provided with a T-coupling 63, in which the rod 18, previously described, may be adjustably clamped. The coupling 63 is set to one side of the rod 60 to such a distance that when the telescope is secured to the upturned end of rod 18 and adjusted parallel to the shaft the intervening objects will not interfere with the line of vision therethrough. When the bar 62 is set in the correct position, a weight 64 is placed on the opposite end of said bar from rod 18 to counterbalance the weight of said rod and the telescope, so that there will be no tendency to swing the supports thereof which engage the shaft. I also provide an offset for the target 52 which is identical in every particular to that just described, it consisting of a rod 65, which is clamped in tube 47, T-coupling 66 and 68, bar 67, and counterweight 69. In setting up the instruments when this offset is used the distance which the rods 49 and 18 are offset from their respective vertical supporting-tubes 47 and 17 is made exactly the same. This may be accurately determined in various ways—for example, by providing the bars 62 and 67 with scales. When the offsets are properly adjusted and the movable target is hung on the opposite end of the shafting from the telescope, the fixed target may then be set up on any suitable support and is adjusted so that its cross-diameters are in line with those of the target 52 and the lines of the telescope. The method of lining up the shafting will then be precisely the same as that previously described.

The provision of the fixed target in connection with the telescope is a most important feature of my invention for the following reasons: If for any cause the telescope should be moved even a very small fraction of an inch, the line of vision would be thrown to a relatively great distance from the shafting at the opposite end, the greater the length of the shafting the greater being the divergence. If, therefore, the telescope should be moved the man at the telescope will immediately note the fact, and before doing anything further the telescope must be readjusted so that they are in line. If there is doubt as to whether the telescope or fixed target have been moved, the movable target may be hung on the shaft near the latter and their actual positions at once ascertained. The plumb-line, which is always kept in front of the telescope, aids in the determination of the correct positions thereof.

By having the telescope supported by the shafting the danger of having it moved by the jar of machinery or the steps of a person is reduced to a minimum.

The means for permitting the rotation of the shaft without disturbing the support for the telescope is also highly important, for the reason that it is almost impossible to work on a line of shafting without accidentally rotating it, and if the support were clamped firmly to the shaft the telescope would be thrown to one side when the shaft was rotated. The fixed target would also be disturbed in the same manner if it were not for the character of the connections with the shaft which I employ.

Having described my invention, what I claim as new, and desire to secure by Letters Patent of the United States, is as follows:

1. An apparatus for alining shafting comprising a telescope, means for supporting the same in a fixed position with respect to the shafting, a movable target, means for connecting the same to the shafting so that the center of the target will always be at the same distance from the center of the point in the shaft to which it is connected as is the line of sight of the telescope from the desired center line of the shafting, and means for determining the level of both telescope and target.

2. An apparatus for alining shafting comprising a telescope, means for supporting the same in a fixed position in line with the shafting, a fixed target, means for supporting the same at a remote point from said telescope in the line of sight thereof, a movable target, and means for holding the same at a fixed distance from the center of the shafting at various positions between the telescope and fixed target.

3. An apparatus for alining shafting comprising a telescope having cross-lines which intersect in the line of sight thereof, means for supporting the same adjacent the shafting so that its line of sight is parallel to the center line of the shaft, a fixed target, means for supporting the same at a point remote from the telescope so that it is in the line of sight thereof, a movable target having scales which read from the center thereof in lines which may be adjusted parallel to said cross-lines, and means for holding said movable target at a fixed distance from the center of the shafting at various points between the telescope and fixed target.

4. An apparatus for alining shafting comprising a telescope having cross-lines perpendicular to each other which intersect in the line of sight thereof, a means for supporting the telescope adjacent one end of the line of shafting and for adjusting the same so that the line of sight is parallel to the desired center line of the shafting, a fixed target which is supported at the opposite end of the shafting so that its center is in line with the line of sight of the telescope, a movable target which is divided into four right-angled sectors which have a common vertex, the edges of each sector being provided with a scale which reads regularly from the common vertex of the sectors, means for holding said movable target in a fixed relation to the shaft at different points thereon so that the vertex of the sectors will be at the same distance from the center of the shafting at the point at which the target is applied as is the line of sight of the telescope from the desired center line of the shafting, and means for adjusting said telescope and movable target so that the cross-lines of the telescope and edges of the sectors will be respectively parallel.

5. An apparatus for alining shafting comprising a telescope having cross-lines perpendicular to each other which intersect in the line of sight thereof, means for supporting the telescope adjacent one end of the line of shafting and for adjusting the same so that the line of sight is parallel to the desired center line of the shafting, a movable target which is divided into four right-angled sectors which have a common vertex, the edges of each sector being provided with a scale which reads regularly from the common vertex of the sectors, means for holding said movable target in a fixed relation to the shaft at different points thereon so that the vertex of the sectors will be at the same distance from the center of the shafting at the point at which the target is applied as is the line of sight of the telescope from the desired center line of the shafting, and means for adjusting said telescope and movable target so that the cross-lines of the telescope and edges of the sectors will be respectively parallel.

6. An apparatus for alining shafting comprising a telescope having cross-lines perpendicular to each other which intersect in the line of sight thereof, means for supporting the telescope adjacent one end of the line of shafting and for adjusting the same so that the line of sight is parallel to the desired center line of the shafting, a fixed target which is supported at the opposite end of the shafting so that its center is in line with the line of sight of the telescope, a movable target which is divided into four right-angled sectors having a common vertex, one pair of vertical sectors being adapted to transmit light to a greater degree than the other pair, a series of regular notches which are formed in the edges of the sectors which prevent the passage of light to the greatest degree, said notches being adapted to transmit light with greater freedom than the sectors in which they are formed, means for adjusting said target so that the edges of said sectors will be relatively parallel to the cross-lines of the telescope, means for holding said movable target in a fixed relation to the shaft at different points thereon so that the vertex of the sectors will be at the same distance from the center of the shafting at the point at which the target is applied as is the line of sight of the telescope from the desired center line of the shafting.

7. An apparatus for alining shafting comprising a telescope, means for supporting the same on the shafting and for holding the same so that the shaft may rotate without moving the telescope, means for adjusting the telescope so that its line of sight is parallel to the desired center line of the shafting, a movable target, and means for holding the same in a fixed relation to the shaft at any point therein so that the center of the target will be at the same distance from the center of the shafting at the point to which it is applied as is the line of sight of the telescope from the desired center line of the shafting.

8. An apparatus for alining shafting comprising a telescope, means for supporting the same on the shafting and for holding the same so that the shaft may rotate without moving the telescope, means for adjusting the telescope so that its line of sight is parallel to the desired center line of the shafting, a movable target, means for holding the same in a fixed relation to the shaft at any point therein so that the center of the target will be at the same distance from the center of the shafting at the point to which it is applied as is the line of sight of the telescope from the desired center line of the shafting, a fixed target, means for partially supporting the same on said shaft at a point remote from said telescope and for holding the same so that the shaft may be rotated without moving it, and means for adjusting said fixed target so that it is in line with the line of sight of the telescope.

9. An apparatus for alining shafting comprising two standards, means for adjusting the same so that they may be simultaneously moved toward or away from each other to the same degree, a pair of diverging fingers on each standard which are so arranged that they may simultaneously engage a shaft and hold the same so that its center is equidistant from said standards whatever its size, a hinge in one of said standards which is located between the base thereof and a line which passes through the center of the shaft to the shaft and is perpendicular to a tangent at the point where the finger of the hinged standard which is nearest its base touches the shaft, means for holding the fingers of said hinged standard in engagement with the shaft and for swinging its fingers away from the shaft without separating the standards at their bases.

10. An apparatus for alining shafting comprising two V-shaped jaws, standards on which said jaws are supported, a swiveled rod having right and left screw-threads at opposite ends which are threaded in said standards respectively, whereby said jaws may be made to simultaneously engage shafts of different diameters in the same relative positions, and means for moving one of said jaws out of engagement with the shaft without rotating said rod.

11. An apparatus for alining shafting comprising two V-shaped jaws, standards on which said jaws are supported, a swiveled rod having right and left screw-threads at opposite ends which are threaded in said standards respectively, whereby said jaws may be made to simultaneously engage shafts of different diameters in the same relative positions, a target having diameters which intersect at the center thereof, an adjustable connection between said target and said rod, the center line of the shaft when engaged by said jaws and one of the diameters of the target being on the same plane, means for determining when the other diameter is in a horizontal position, a telescope having perpendicular cross-lines which intersect in its line of sight, and means for supporting the same so that its line of sight will be parallel to the desired center line of the shaft and one of its cross-lines will be in a plane of said center line.

12. An apparatus for alining shafting comprising two V-shaped jaws, standards on which said jaws are supported, a swiveled rod having right and left screw-threads at opposite ends which are threaded in said standards respectively, whereby said jaws may be made to simultaneously engage shafts of different diameters in the same relative positions, a target having four right-angled sectors which have a common vertex at the center thereof, an adjustable connection between said target and said rod, means for adjusting said target while connected to the shaft so that one edge of each sector will be in a horizontal position, a telescope having perpendicular cross-lines which intersect in its line of sight, means for supporting said telescope so that its line of sight is parallel to the desired center line of the shafting and one of its cross-lines is horizontal.

13. An apparatus for alining shafting comprising two V-shaped jaws, standards on which said jaws are supported, a swiveled rod having right and left screw-threads at opposite ends which are threaded in said standards respectively, whereby said jaws may be made to simultaneously engage shafts of different diameters in the same relative positions, a joint in one of said standards which is located between the base thereof and a line which passes through the center of the shaft and is perpendicular to a tangent to the shaft at the point where the part of the jaw nearest said base engages the shaft, a measuring-rod which is connected to said threaded rod and extends in a line which passes through the center of the shaft, a collar which is adapted to slide on said measuring-rod, a link connection between said collar and the hinged portion of said standard, and means for holding said collar in a fixed position on said rod.

14. An apparatus for alining shafting comprising an upright support, a pair of hooks or fingers which are secured to the upper end thereof and are arranged to engage the shaft, means for securing the lower end of said support in a fixed position, a telescope, a supporting-rod therefor, a pair of jaws which are connected to said rod, means for holding said jaws in engagement with the shaft, and means connecting said rod to said support.

15. An apparatus for alining shafting comprising an upright support, fingers secured to the upper end thereof which rest on the shaft, means for securing the lower end thereof in a fixed position, a target, and means for adjustably securing the same to said support.

16. An apparatus for alining shafting comprising a telescope, means for adjustably securing the same in a fixed position with respect to the shafting at one end thereof, a target which is adapted to be adjustably secured in the line of sight of the telescope at the opposite end of the shaft, said target having a face which is adapted to permit the passage of light, and means for illuminating the opposite side of the face from the telescope.

In testimony whereof I have signed my name to this specification in presence of two subscribing witnesses.

RICHARD KINKEAD.

Witnesses:
EDGAR E. MANN,
JOHN C. SANBORN.